(12) United States Patent
Choi

(10) Patent No.: US 9,523,321 B2
(45) Date of Patent: Dec. 20, 2016

(54) METHOD AND SYSTEM OF CONTROLLING EXHAUST AFTER-TREATMENT APPARATUS FOR VEHICLE

(71) Applicant: Hyundai Motor Company, Seoul (KR)

(72) Inventor: Sung Mu Choi, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 108 days.

(21) Appl. No.: 14/569,645

(22) Filed: Dec. 13, 2014

(65) Prior Publication Data
US 2015/0308363 A1 Oct. 29, 2015

(30) Foreign Application Priority Data
Apr. 24, 2014 (KR) .......................... 10-2014-0049098

(51) Int. Cl.
*F02D 41/14* (2006.01)
*G01M 15/10* (2006.01)
(Continued)

(52) U.S. Cl.
CPC ........... *F02D 41/1439* (2013.01); *F01N 3/035* (2013.01); *F01N 3/0842* (2013.01); *F01N 3/108* (2013.01); *F01N 3/2073* (2013.01); *F01N 13/009* (2014.06); *F02D 41/0235* (2013.01); *F02D 41/1441* (2013.01); *F02D 41/1446* (2013.01); *F02D 41/1454* (2013.01);
(Continued)

(58) Field of Classification Search
CPC .............. F02D 41/1439; F02D 41/0235; F02D 41/1456; F02D 41/1441; F02D 41/1446; F02D 41/1474; F02D 41/1454; F02D 2041/1469; G01M 15/104; F01N 2570/24; F01N 3/0842; F01N 3/108; F01N 3/035; F01N 3/2073; F01N 13/009
USPC ....... 123/672, 673, 676, 690, 691, 703, 704, 123/443; 701/103–105, 109; 60/274, 276, 60/285
See application file for complete search history.

(56) References Cited

U.S. PATENT DOCUMENTS 6,826,902 B2 * 12/2004 Sun ..................... F01N 13/0097
60/274
7,565,799 B2 * 7/2009 Brown ................. F01N 3/0871
60/274
(Continued)

FOREIGN PATENT DOCUMENTS

JP 2004-324455 A 11/2004
JP 2006-022755 A 1/2006
(Continued)

*Primary Examiner* — Hai Huynh
(74) *Attorney, Agent, or Firm* — Mintz Levin Cohn Ferris Glovsky and Popeo, P.C.; Peter F. Corless

(57) ABSTRACT

A system and method for controlling an exhaust after-treatment apparatus for vehicle are provided. The method includes detecting, by a controller, signals from a front lambda sensor and a rear lambda sensor of a Lean NOx Trap (LNT), when an engine is driven in a rich mode and acquiring, by the controller, a temperature of exhaust gas detected by a temperature sensor, when the engine is driven in a rich mode. Further the method includes comparing, by the controller, the signals from the front lambda sensor and the rear lambda sensor to detect a breakthrough time when a breakthrough occurs between the signals from the front lambda sensor and the rear lambda sensor. In addition, the controller is configured to determine an additional rich time period based on the breakthrough time and the temperature of exhaust gas.

15 Claims, 8 Drawing Sheets

(51) Int. Cl.
*F02D 41/02* (2006.01)
*F01N 3/20* (2006.01)
*F01N 3/08* (2006.01)
*F01N 3/10* (2006.01)
*F01N 3/035* (2006.01)
*F01N 13/00* (2010.01)

(52) U.S. Cl.
CPC ..... *F02D 41/1456* (2013.01); *F02D 41/1474* (2013.01); *G01M 15/104* (2013.01); *F01N 2570/24* (2013.01); *F02D 2041/1469* (2013.01); *Y02T 10/24* (2013.01)

(56) References Cited

U.S. PATENT DOCUMENTS

2004/0031261 A1* 2/2004 Sun ................... F02D 41/0275
   60/277
2015/0337709 A1* 11/2015 Choi ................... F01N 3/2066
   60/274

FOREIGN PATENT DOCUMENTS

| | | |
|---|---|---|
| JP | 2009-209898 | 9/2009 |
| KR | 10-0529708 A | 11/2005 |
| KR | 10-2011-0049155 | 5/2011 |
| KR | 10-2011-0062614 | 6/2011 |
| KR | 10-2011-0063140 | 6/2011 |

\* cited by examiner

US 9,523,321 B2

METHOD AND SYSTEM OF CONTROLLING EXHAUST AFTER-TREATMENT APPARATUS FOR VEHICLE

CROSS-REFERENCE TO RELATED APPLICATION(S)

This application claims under 35 U.S.C. §119(a) the benefit of Korean Patent Application No. 10-2014-0049098 filed on Apr. 24, 2014, the entire contents of which are incorporated herein by reference.

BACKGROUND

Technical Field

The present disclosure relates to a method for controlling an exhaust after-treatment apparatus for a vehicle and more particularly, a method for controlling an exhaust after-treatment apparatus for a vehicle that improves exhaust after-treatment performance by controlling an amount of ammonia ($NH_3$) generated by a Lean NOx Trap (NLT).

Background Art

With the strengthening of vehicle emission regulations, a DeNOx catalyst technique (e.g., Lean NOx Trap (LNT), Selective Catalytic Reduction (SCR) and the like) has been applied to an after-treatment apparatus to reduce nitrogen oxides (NOx) in exhaust gas.

The DeNOx catalyst is a type of catalyst converter that removes NOx included in exhaust gas. The DeNOx catalyst causes an oxidation-reduction reaction between NOx and a reducing agent (e.g., urea, ammonia ($NH_3$), carbon monoxide (CO), or hydrocarbon (HC)), to reduce NOx by the oxidation-reduction reaction with the reducing agent.

Recently, a LNT (or referred to as a LNT catalyst) has been used as an after-treatment apparatus to remove NOx from exhaust gas ingredients generated when a lean-burn engine operates. The LNT absorbs or occludes NOx included in exhaust gas in a lean environment, and desorbs the absorbed or occluded NOx in a rich environment.

A SCR system may effectively reduce NOx by supplying a reducing agent to a SCR catalyst. The SCR system supplies a reducing agent to exhaust gas to reduce NOx, unlike an Exhaust Gas Recirculation (EGR) apparatus of reducing NOx by recirculating exhaust gas to lower the combustion temperature of a combustion chamber. "Selective Catalyst Reduction (SCR)" means making a reducing agent, such as urea, $NH_3$, CO, HC, and the like, react with NOx among oxygen and NOx.

A Diesel Oxidation Catalyst (DOC), a Diesel Particulate Filter (DPF), and a Catalyzed Particulate Filter (CPF) have been developed and used within vehicles to reduce particulates from exhaust gas. Recently, a SCR on Diesel Particulate Filter (SDPF) that collects particulates and reduces NOx has been used.

The SDPF, which is manufactured by coating a porous DPF with a SCR catalyst, causes $NH_3$ to react with NOx in exhaust gas within the SCR catalyst to generate water and nitrogen ($N_2$), while collecting particulates in the exhaust gas though the filter function, that is, the DPF function. Accordingly, although various after-treatment apparatuses are used to meet vehicle emission regulation, strengthening of the vehicle emission regulations requires an after-treatment apparatus with greater optimal performance. Meanwhile, in the LNT catalyst, a NOx absorbing catalyst and a Diesel Oxidation Catalyst (DOC) are included within a carrier. When the engine is driven in a lean mode, NOx is absorbed by a catalyst washcoat, and when the engine is driven in a rich mode, diesel fuel is used as a reducing agent to reduce the absorbed NOx to nitrogen ($N_2$).

Generally, a diesel engine is driven in a lean mode, in which an amount of air that enters the engine is more than that of an equivalence ratio, and NOx generated when the diesel engine is driven in the lean mode is absorbed within a LNT catalyst, which is a NOx Storage Catalyst (NSC). To reduce the NOx absorbed in the LNT catalyst to nitrogen ($N_2$), a throttle valve is closed by a predetermined amount to reduce inflowing air, and post combustion is induced to switch the lean mode to the rich mode.

For driving in the lean mode and the rich mode, signals from lambda sensors or NOx sensors installed before and after the LNT catalyst are used. However, since NOx sensors are expensive, lambda sensors are generally used. When NOx absorbed within the LNT catalyst reaches a predetermined level, the lean mode is switched to the rich mode to commence NOx regeneration control from a predetermined level (e.g., a level ranging from about 0.92 to about 0.94) based on a signal from the lambda sensor installed before the LNT catalyst, and a reducing agent generated by driving in the rich mode, acts to reduce NOx absorbed within the LNT catalyst to $N_2$.

In the LNT catalyst, the amount of the absorbed NOx is gradually reduced, and as the rich mode continues while reactants decrease, an amount of slipped reducing agents increases. Accordingly, a value detected by the lambda sensor installed after the LNT catalyst gradually converges to a value detected by the lambda sensor installed before the LNT catalyst, which represents that reducing agents are slipped after the LNT catalyst.

The above information disclosed in this section is merely for enhancement of understanding of the background of the invention and therefore it may contain information that does not form the prior art that is already known in this country to a person of ordinary skill in the art.

SUMMARY

The present disclosure provides a method for controlling an exhaust after-treatment apparatus for a vehicle that may improve exhaust after-treatment performance by providing an additional rich-mode driving time period after a time (e.g., a breakthrough time) when a signal from a front lambda sensor is substantially similar (e.g., about the same value) to a signal from a rear lambda sensor to limit an amount of ammonia ($NH_3$) generated by a Lean NOx Trap (LNT).

In one aspect, the present invention provides a method for controlling an exhaust after-treatment apparatus that may include: detecting signals from a front lambda sensor and a rear lambda sensor of a Lean NOx Trap (LNT); acquiring a temperature of exhaust gas detected by a temperature sensor, when an engine is driven in a rich mode; comparing the signals from the front lambda sensor and the rear lambda sensor to detect a breakthrough time when a breakthrough occurs between the signals from the front lambda sensor and the rear lambda sensor; and determining an additional rich time period based on the breakthrough time and the temperature of exhaust gas. The engine may continue to be driven in the rich mode for the additional rich time period after the breakthrough time. Further, the breakthrough time may be a time when the signal from the front lambda sensor is about the same as the signal from the rear lambda sensor, when the engine is driven in the rich mode.

The determination of the additional rich time period may include: determining the additional rich time period as a, when the temperature of exhaust gas is less than T1 and the breakthrough time is earlier (e.g., less) than t1; determining the additional rich time period as a+β, when the temperature of exhaust gas is less than T1 and the breakthrough time is later than (e.g., greater than) or equal to t1 and earlier than (e.g., less than) t2; and determining the additional rich time period as a+γ, when the temperature of exhaust gas is less than T1 and the breakthrough time is later than or equal to t2, wherein β<γ, t1<t2, and b>c>a when T1 is less than or equal to about 250° C.

In addition, the determination of the additional rich time period may include: determining the additional rich time period as b, when the temperature of exhaust gas is greater than or equal to T1 and less than T2, and the breakthrough time is earlier than t1; determining the additional rich time period as b+β, when the temperature of exhaust gas is greater than or equal to T1 and less than T2, and the breakthrough time is later than or equal to t1 and earlier than t2; and determining the additional rich time period as b+γ, when the temperature of exhaust gas is greater than or equal to T1 and less than T2, and the breakthrough time is later than or equal to t2, wherein β<γ, t1<t2, T1<T2, and b>c>a when T1 is less than or equal to about 250° C. and T2 is greater than or equal to about 350° C.

Further, the determination of the additional rich time period may include: determining the additional rich time period as c, when the temperature of exhaust gas is greater than or equal to T2, and the breakthrough time is earlier than t1; determining the additional rich time period as c+β, when the temperature of exhaust gas is greater than or equal to T2, and the breakthrough time is later than or equal to t1 and earlier than t2; and determining the additional rich time period as c+γ, when the temperature of exhaust gas is greater than or equal to T2, and the breakthrough time is later than or equal to t2, wherein β<γ, t1<t2, and b>c>a when T2 is greater than or equal to about 350° C.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
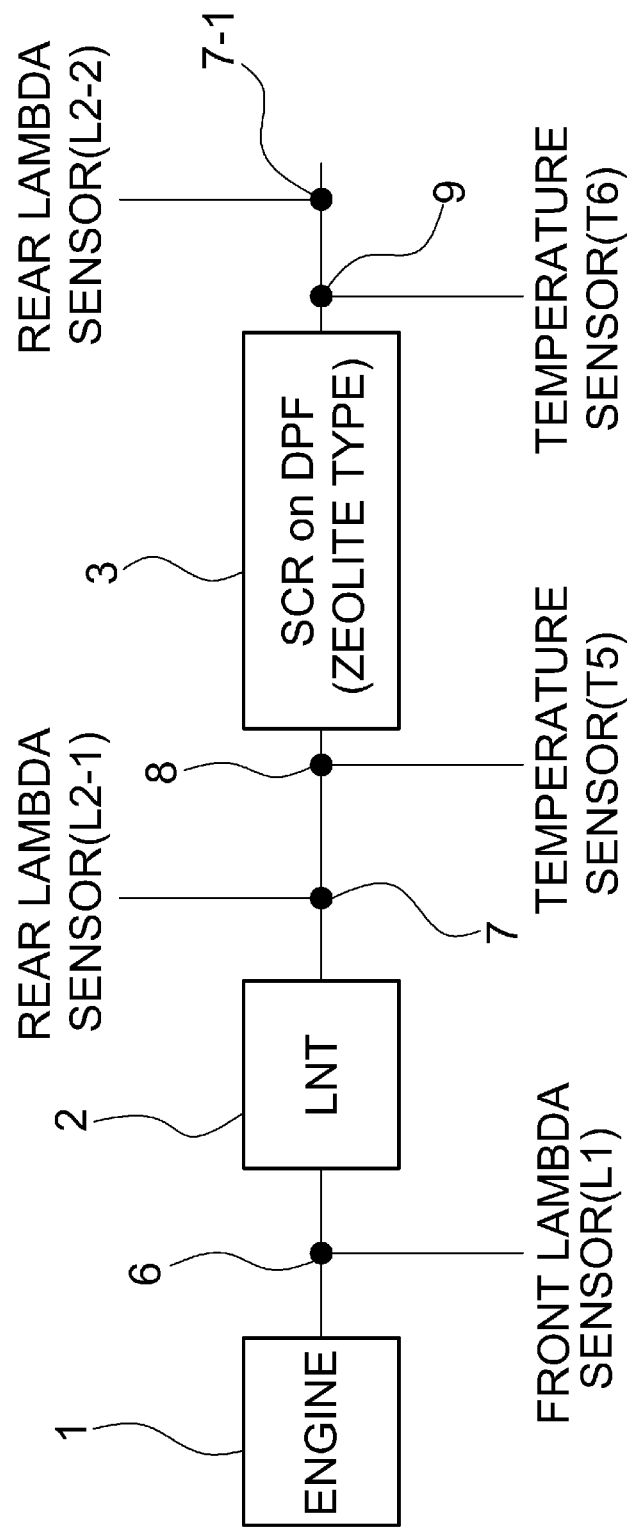
FIG. 1 is an exemplary block diagram illustrating a configuration of an exhaust after-treatment apparatus according to an exemplary embodiment of the present disclosure.

Reference numerals set forth in the Drawings includes reference to the following elements as further discussed below:

1: engine
2: LNT
3: SCR (SDPF)
4: DPF
5: SCR
6: front lambda sensor
7, 7-1, 7-2, 7-3: rear lambda sensor
8, 9, 10: temperature sensor It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Exemplary embodiments of the present disclosure relate to a combination system of a Lean NOx Trap (LNT) and a passive Selective Catalyst Recirculation (SCR) to meet strengthened emission regulation, and provide a method that controls an amount of ammonia ($NH_3$) generated by the LNT.

FIG. 1 is an exemplary block diagram illustrating a configuration of an exhaust after-treatment apparatus according to an exemplary embodiment of the present disclosure. Referring to FIG. 1, a LNT (e.g., a LNT catalyst) 2 and a zeolite type SCR (e.g., a zeolite type SCR catalyst) 3 may be arranged as shown based on flow of exhaust gas to allow exhaust gas discharged from an engine 1 to pass through the LNT 2 and the SCR 3. In other words, the LNT 2 may be disposed after the engine 1, and the SCR 3 may be disposed after the LNT 2.

The SCR 3 may be a SCR on Diesel Particulate Filter (SPDF) that collects particulates and reduces NOx. The SDPF, which may be manufactured by coating a porous DPF with a SCR catalyst, may cause ammonia ($NH_3$) to react with NOx within exhaust gas in the SCR catalyst to generate water and nitrogen ($N_2$), while collecting particulates in the exhaust gas. The combination of the SDPF 3 and the LNT 2 may form a passive SCR to desorb NOx absorbed in the LNT 2 in a rich environment to generate ammonia ($NH_3$) as a by-product, and to cause $NH_3$ to react with NOx in exhaust gas in the SDPF 2, which reduces the NOx.

Figure 2:
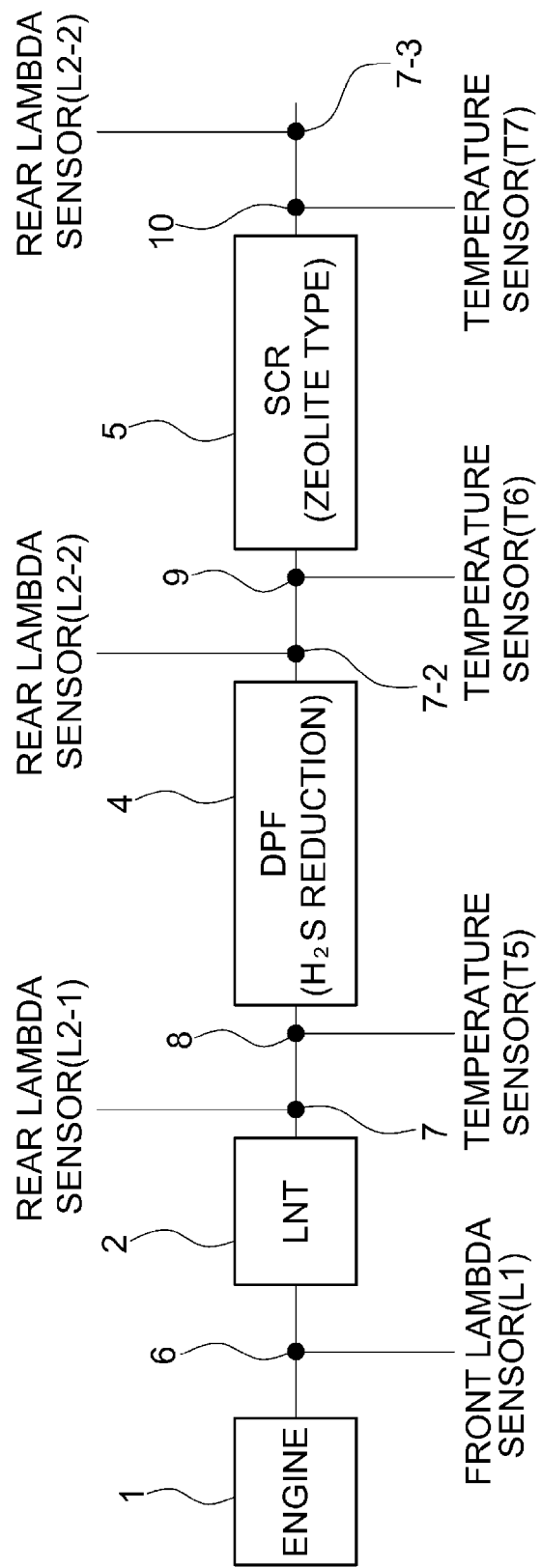
FIG. 2 is an exemplary block diagram illustrating a configuration of an exhaust after-treatment apparatus according to an exemplary embodiment of the present disclosure.

FIG. 2 is an exemplary block diagram illustrating a configuration of an exhaust after-treatment apparatus according to an exemplary embodiment of the present disclosure. Referring to FIG. 2, a LNT 2, a $H_2S$ reduction type Diesel Particulate Filter (DPF) 4, and a zeolite type SCR 5 may be disposed as shown based on flow of exhaust gas so exhaust gas discharged from an engine 1 may pass through the LNT 2, the DPF 4, and the SCR 5. In other words, the LNT 2 may be disposed after the engine 1, and the DPF 4 may be disposed between the LNT 2 and the SCR 5.

In the exemplary embodiments shown in FIGS. 1 and 2, a front lambda sensor 6 may be configured to detect a density of oxygen in exhaust gas and may be disposed between the engine 1 and the LNT 2 and a rear lambda sensor 7 may be disposed after the LNT 2. In addition, the front lambda sensor may be disposed before the LNT 2. In particular, as shown in FIG. 1, the rear lambda sensor 7 or 7-1 may be disposed after the SDPF 3, in other words, after the LNT 2 or after the SDPF 3. Further, as shown in FIG. 2, the rear lambda sensor 7, 7-2, or 7-3 may be disposed after the LNT 2, after the DPF 4, or after the SCR 5.

In addition, the exhaust after-treatment apparatus may include at least one temperature sensor configured to detect a temperature of exhaust gas. In particular, as shown in FIG. 1, temperature sensors 8 and 9 may be disposed after the LNT 2 and after the SDPF 3, respectively, and shown in FIG. 2, temperature sensors 8, 9, and 10 may be disposed after the LNT 2, after the DPF 4, and after the SCR 5, respectively. In the exhaust after-treatment apparatus configured as shown in FIGS. 1 and 2, when the engine 1 is operated in a rich mode, the LNT 2 may generate $NH_3$, and the SCR 5 or the SDPF 3 (hereinafter, collectively referred to as a SCR) causes the $NH_3$ to react with NOx, which may reduce nitrogen oxides in exhaust gas.

In the exhaust after-treatment apparatus, as a rich-mode driving time period (e.g., a rich time period) when the engine 1 is driven in the rich mode increases, $NH_3$ and hydro carbon (HC)/carbon monoxide (CO) may also increase. However, to optimally adjust the rich time period, the rich time period may be set and adjusted based on driving conditions of the engine.

When a determined rich time period is longer than (e.g., greater than) a time period (e.g., an optimal rich time period) for optimal adjusting of the rich time period, the slip of CO/HC may increase while a generated amount of $NH_3$ may not substantially increase, which may decrease fuel efficiency. When the determined rich time period is shorter than (e.g., less than) the optimal rich time period for optimal adjustment, the contribution degree of the SCR 3 or 5 to purification of NOx may decrease since the generation amount of $NH_3$ is minimal although the slip of CO/HC decreases. Accordingly, the exhaust after-treatment apparatus according to the exemplary embodiment of the present disclosure may optimally adjust a rich time period based on driving conditions of the engine 1 to optimize a generated amount of $NH_3$ of the LNT 2, which may cause the SCR 3 or 5 to efficiently purify NOx.

The exhaust after-treatment apparatus may be configured to determine an optimal rich time period based on driving conditions of the engine 1 when a rich environment is periodically formed to reduce NOx absorbed and stored within the LNT 2, which may increase a generated amount of $NH_3$, increase a purification rate of NOx of the SCR 3 or 5, decrease the slip of CO/HC, and preventing a decrease in fuel efficiency.

When a breakthrough time when a signal from the front lambda sensor 6, located before the LNT 2, is about the same as a signal from the rear lambda sensor 7, 7-1, 7-2 or 7-3, located after the LNT 2, the engine 1 is driven in the rich mode, the signal from the front lambda sensor 6 to be similar to the signal from the rear lambda sensor 7, 7-1, 7-2, or 7-3, a generated amount of $NH_3$ may increase by lengthening the rich time period by a predetermined period of time α. When the engine 1 enters the rich mode may be denoted by $t_{bt}$, and a time period taken for the signal from the front lambda sensor 6 to be similar to the signal from the rear lambda sensor 7, 7-1, 7-2, or 7-3 may be denoted by t.

However, the slip of CO/HC may also increase. Accordingly, a time period α (e.g., an additional rich time period) may need to be optimized after the breakthrough time $t_{bt}$ based on driving conditions of the engine 1. To optimize the additional rich time period α, main factors that influence generation of $NH_3$, such as a temperature and flow of exhaust gas, a degree of catalyst aging, and a time period t taken to reach the breakthrough time $t_{bt}$ when the engine 1 is driven in the rich mode, which may be engine/catalyst conditions, an engine lambda value (e.g., an air fuel ratio) may be set to a substantially constant value.

The additional rich time period α may be determined based on a temperature T of exhaust gas and a breakthrough time $t_{bt}$ when a signal from the front lambda sensor 6 is about the same as a signal from the rear lambda sensor 7, 7-1, 7-2, or 7-3 after the engine 1 enters the rich mode, and the factors that influence the generation of $NH_3$ (e.g., as a temperature and flow of exhaust gas, a degree of catalyst aging, and a time period t taken to reach the breakthrough time $t_{bt}$).

Figure 3:
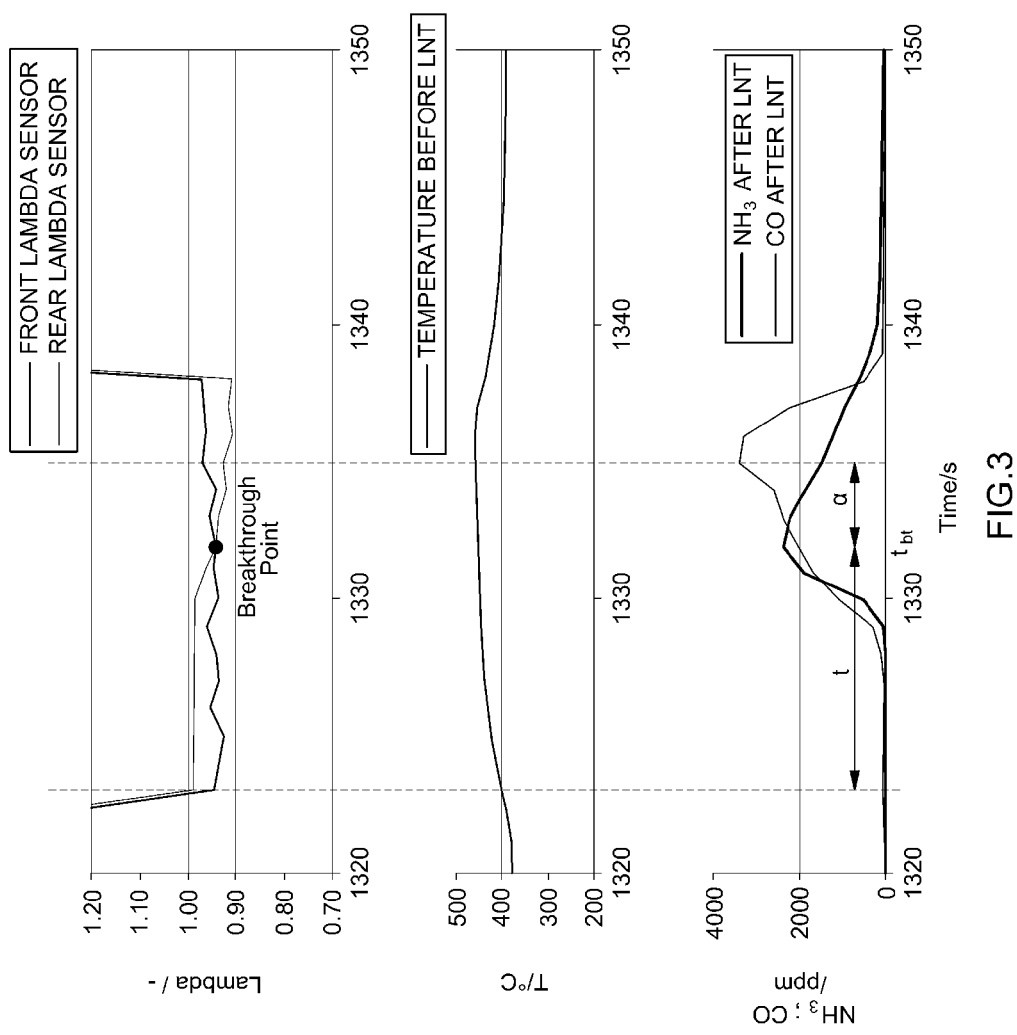
FIG. 3 is an exemplary view for describing an ammonia ($NH_3$) generation mechanism of a Lean NOx Trap (LNT) according to an exemplary embodiment of the present disclosure.

FIG. 3 is an exemplary view for describing $NH_3$ generation mechanism of the LNT 2 according to an exemplary embodiment of the present disclosure. The top graph of FIG. 3 shows exemplary signals (e.g., lambda values) from the front lambda sensor 7 and the rear lambda sensor 7, 7-1, 7-2, or 7-3, the middle graph of FIG. 3 shows an exemplary temperature of exhaust gas before the LNT 2, and the bottom graph of FIG. 3 shows exemplary densities of $NH_3$ and CO after the LNT 2.

Referring to the top graph of FIG. 3, before a breakthrough time when signals from the front lambda sensor 6 and the rear lambda sensor 7-1, 7-2, or 7-3 may intersect with each other to cause the lambda values to become about the same, NOx may be stored and absorbed in the LNT 2 in the lean mode, and the absorbed NOx may be broken down into nitrogen ($N_2$) and purified in the rich mode. This process may be expressed as Reaction Equation 1 below.

$$Ba(NO_3)_2 + 3CO \rightarrow 2NO + 2CO_2 + BaCO_3$$

$$2NO + 2CO \rightarrow N_2 + 2CO_2 \qquad \text{Reaction Equation 1}$$

Wherein, $Ba(NO_3)_2$ is barium nitrate, CO is carbon monoxide, NO is nitrogen oxide, $CO_2$ is carbon dioxide, $BaCO_3$ is barium carbonate, and $N_2$ is nitrogen.

In addition, after the breakthrough time, $H_2$ may react with NO to generate $NH_3$ for the additional rich time period α when the engine 1 continues to be driven in the rich mode. This process may be expressed as Reaction Equation 2 below.

$$CO + H_2O \rightarrow CO_2 + H_2$$

$$3HC + 3H_2O \rightarrow 3CO + 6H_2$$

$$5H_2 + 2NO \rightarrow 2NH_3 + 2H_2O \qquad \text{Reaction Equation 2}$$

Wherein CO is carbon monoxide, $H_2O$ is water, $CO_2$ is carbon dioxide, $H_2$ is hydrogen, HC is hydrocarbon, NO is nitrogen oxide, and $NH_3$ is ammonia.

$NH_3$ may be generated from the LNT 2, starting from when oxygen stored within an oxygen storage material of the LNT 2 and NOx stored within a NOx absorbing material of the LNT 2 may be consumed. Accordingly, by providing the additional rich time period α, the LNT 2 may be operated to emit a substantial amount of $NH_3$.

Figure 4:
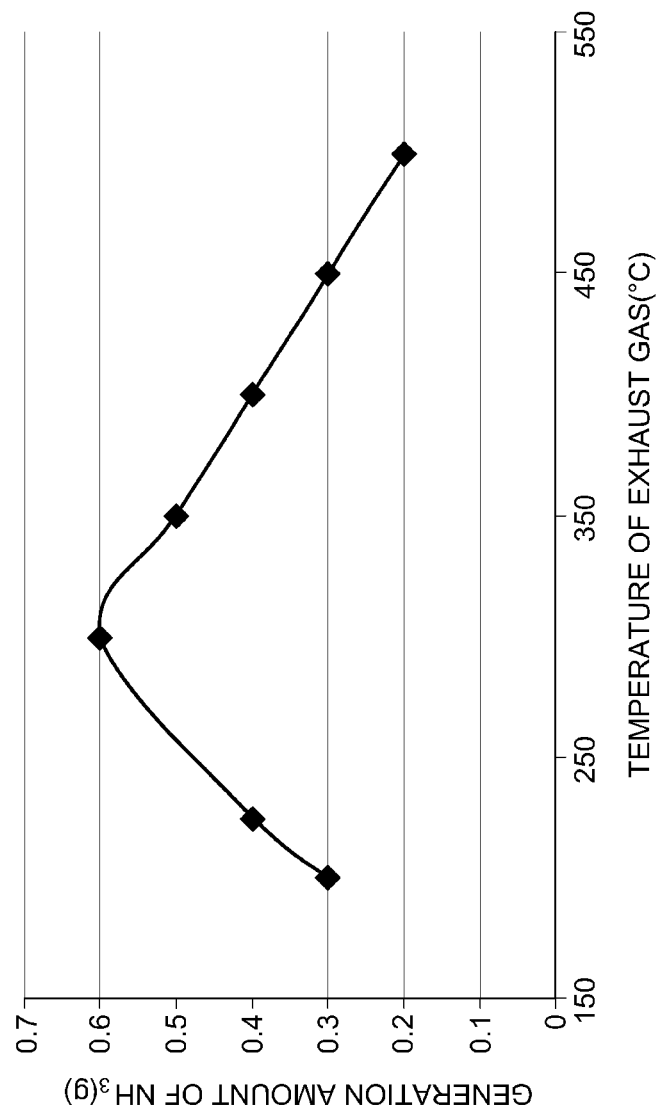
FIG. 4 is an exemplary graph showing a generation amount of $NH_3$ of a LNT with respect to the temperature of exhaust gas in an exhaust after-treatment apparatus according to an exemplary embodiment of the present disclosure.

FIG. 4 is an exemplary graph showing a generation amount of $NH_3$ of the LNT 2 with respect to the temperature of exhaust gas in an exhaust after-treatment apparatus according to an exemplary embodiment of the present disclosure. As shown in FIG. 4, $NH_3$ may be generated at a low temperature around 200° C., a largest amount of $NH_3$ may be generated at a temperature around 300° C., and even at a substantial temperature above about 350° C., $NH_3$ may still be generated. The generation amount of $NH_3$ may be based on the engine lambda value (e.g., the air-fuel ratio), flow of exhaust gas, and density of exhaust gas.

Referring to the lower graph of FIG. 3, since a largest amount of $NH_3$ may be generated at the breakthrough time $t_{bt}$, a generated amount of $NH_3$ may be increased by maintaining the rich mode of the engine 1 for an additional rich time period α after the breakthrough time $t_{bt}$ at which the largest amount of $NH_3$ is generated. However, when the additional rich time period α is substantially short (e.g., less than a predetermined rich time period), a generated amount of $NH_3$ may decrease. In addition, when the additional rich time period α is substantially long (e.g., greater than a predetermined rich time period), an amount of CO may substantially increase although a generated amount of $NH_3$ may increase, which may decrease fuel efficiency. Accordingly, the additional rich time period α may need to be optimally determined. Further, as shown in FIG. 3, for the additional rich time period α, a rate of generation of $NH_3$ per second may decrease gradually.

Figure 5:
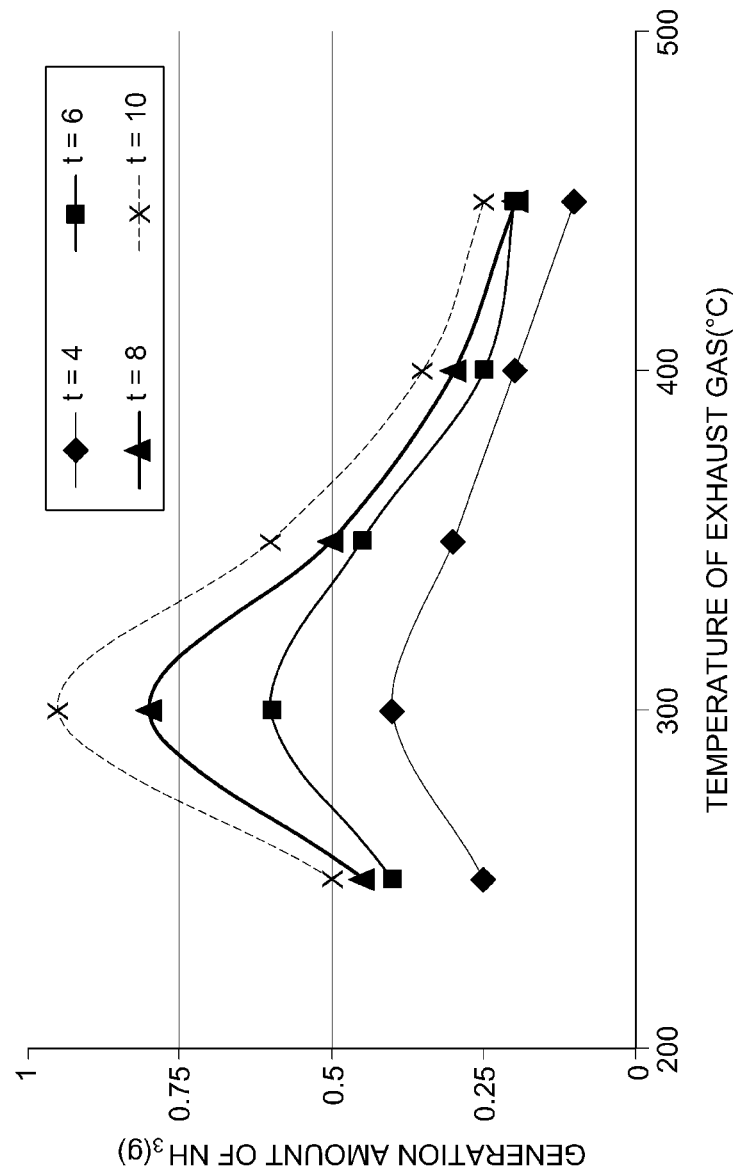
FIG. 5 is an exemplary graph showing generation amounts of $NH_3$ of a LNT with respect to the temperature of exhaust gas based on different breakthrough times, in an exhaust after-treatment apparatus according to an exemplary embodiment of the present disclosure.

FIG. 5 is an exemplary graph showing generation amounts of $NH_3$ of the LNT 2 with respect to the temperature of exhaust gas based on different breakthrough times $t_{bt}$. As shown in FIG. 5, a largest amount of $NH_3$ may be generated when the temperature of exhaust gas is around 300° C. Further, when the temperature of exhaust gas is less than or greater than 300° C., a generated amount of $NH_3$ may decrease.

In addition, as the breakthrough time $t_{bt}$ increase (e.g., the longer a breakthrough time $t_{bt}$), the greater an increase in the amount of $NH_3$. Accordingly, by determining an additional rich time period α based on a temperature of exhaust gas and a breakthrough time $t_{bt}$, the LNT 2 may emit a maximum amount of $NH_3$, which may increase a purification ratio of NOx.

As shown in FIG. 4, when the temperature of exhaust gas is within the range of about 275° C. to about 325° C., a maximum amount of $NH_3$ may be generated, and as the temperature of exhaust gas decrease from about 275° C. to about 225° C. or increase from about 325° C. to about 375° C., the amount of $NH_3$ generated may decrease. When the temperature of exhaust gas exceeds about 375° C., the amount of $NH_3$ generated may substantially decrease. Further, as shown in FIG. 5, as a time period t taken to reach the breakthrough time $t_{bt}$ decreases, the generated amount of $NH_3$ may decrease, and accordingly, an additional rich time period α may also decrease.

Figure 6:
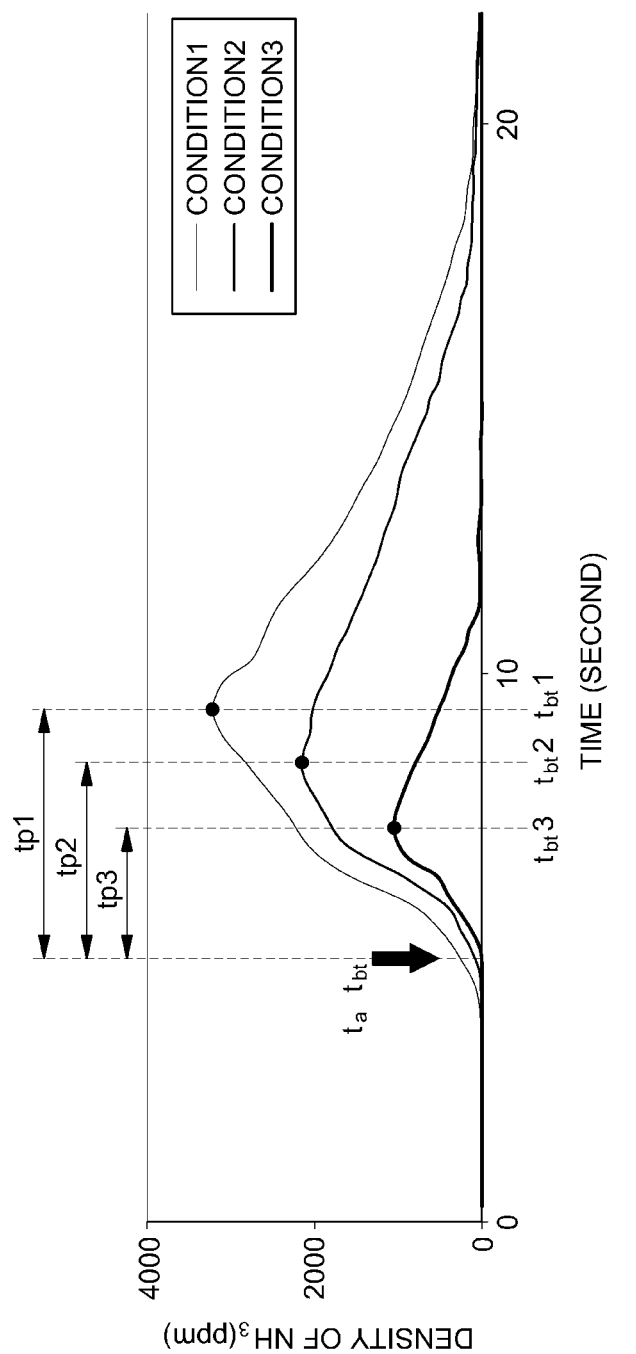
FIGS. 6 and 7 are exemplary graphs showing the densities of $NH_3$ discharged from a LNT based on different conditions, in an exhaust after-treatment apparatus according to an exemplary embodiment of the present disclosure.

FIG. 6 is an exemplary graph showing the densities of $NH_3$ discharged from the LNT 2 over time, when different breakthrough times $t_{bt}$ (e.g., times at which breakthroughs occur between signals from the front lambda sensor 6 and the rear lambda sensor 7, 7-1, 7-2, or 7-3) and different temperatures of exhaust gas are used as control factors.

$t_{bt} = t_{bt}1 (t_{bt}1 > t_{bt}2 > t_{bt}3)$ & temperature of exhaust gas=about 300° C.   Condition 1

$t_{bt} = t_{bt}2 (t_{bt}1 > t_{bt}2 > t_{bt}3)$ & temperature of exhaust gas=about 350° C.   Condition 2

$t_{bt} = t_{bt}3 (t_{bt}1 > t_{bt}2 > t_{bt}3)$ & temperature of exhaust gas=about 400° C.   Condition 3

In FIG. 6, a first graph may be obtained when the condition 1 is selected as control factors, a second graph may be obtained when the condition 2 is selected as control factors, and a third graph may be obtained when the condition 3 is selected as control factors. As shown in FIG. 6, since different breakthrough times $t_{bt}$ and different temperatures of exhaust gas are used as control factors, the density peak values of $NH_3$ may appear at different time. As seen from the first, second, and third graphs, the density peak values of $NH_3$ may decrease in order, and the emission amounts of $NH_3$ may also decrease in order. The graphs show a similar pattern of emission density of $NH_3$ although different conditions are selected as control factors.

In FIG. 6, time periods tp1, tp2, and tp3 may represent time periods from an arbitrary time $t_a$ to times $t_{bt}1$, $t_{bt}2$, and $t_{bt}3$ at which the densities of $NH_3$ reach peak values, respectively. The time periods tp1, tp2, and tp3 may be respectively determined as additional rich time periods a for the respective conditions 1, 2, and 3. In other words, a time difference between an arbitrary reference time $t_a$ and a breakthrough time $t_{bt}$ ($t_{bt}1$, $t_{bt}2$, $t_{bt}3$) may be determined as an additional rich time period α. Accordingly, by using a temperature of exhaust gas and a breakthrough time $t_{bt}$ as control factors for determining an additional rich time period α, and determining an additional rich time period α after the breakthrough time $t_{bt}$ based on the temperature of exhaust gas and the breakthrough time $t_{bt}$, a generated amount of $NH_3$ may be effectively increased.

Figure 7:
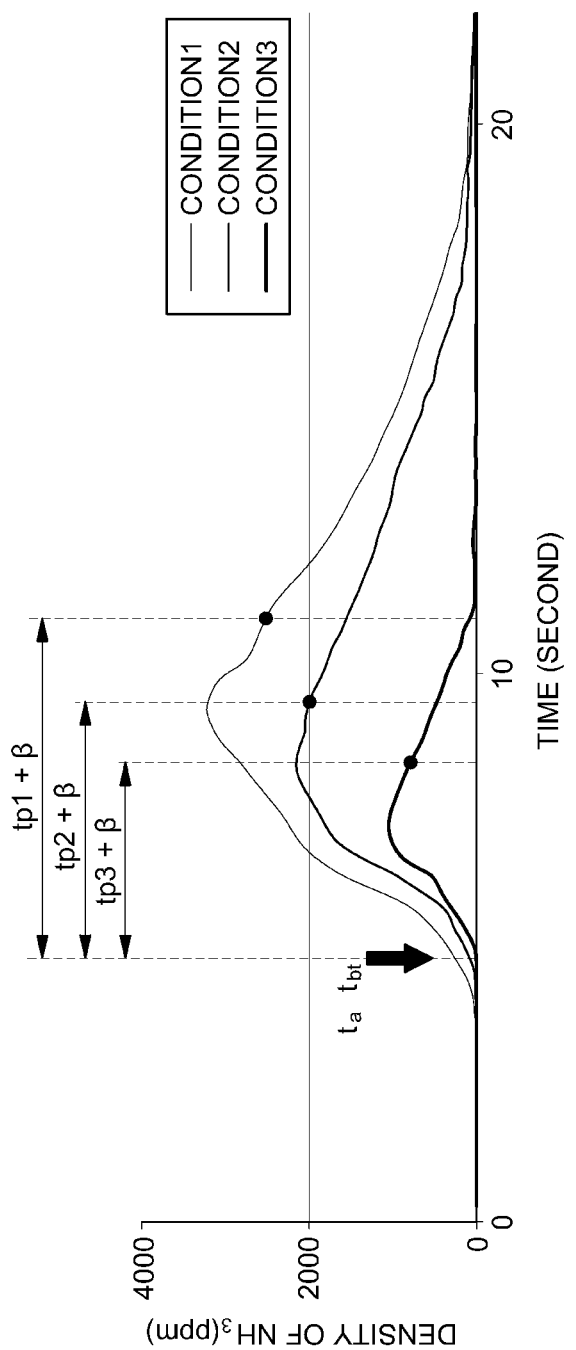

FIG. 7 is an exemplary graph showing the densities of $NH_3$ discharged from the LNT 2 over time, according to the conditions 1, 2, and 3 described above with reference to FIG. 6. In the graphs of FIG. 7, tp1, tp2, and tp3 may represent time periods from an arbitrary time $t_a$ to times at which the densities of $NH_3$ reach peak values, respectively, and β1, β2, and β3 may represent time periods for which the rich mode is maintained after the times $t_{bt}1$, $t_{bt}2$, and $t_{bt}3$, respectively. In particular, tp1+β1, tp2+β2, and tp3+β3 may be respectively determined as additional rich times periods a for the respective conditions 1, 2, and 3. In other words, a time difference between an arbitrary reference time $t_a$ and a time $t_{bt}+\beta(t_{bt}1+\beta, t_{bt}2+\beta, t_{bt}3+\beta)$ may be determined as an additional rich time period α.

As the value of β1, β2, or β3 increases, a generated amount of $NH_3$ of the LNT 2 may also increase. However, since the slip amount of CO/HC also increases, the value of β1, β2, or β3 may be preferably set to about 2 seconds or less. The additional rich time period α may be determined by a main controller of a vehicle, and an engine controller may be configured to operate the engine 1 based on the additional rich time period α based on a signal transferred from the main controller.

Accordingly, to determine an additional rich time period α based on a temperature of exhaust gas and a breakthrough time $t_{bt}$ and adjust a generated amount of $NH_3$ based on the additional control time period α, the main controller may be configured to determine the additional rich time period α and lengthen the rich mode of the engine 1, using a process as follows. The main controller may be configured to determine whether a driving mode of the engine 1 is in the rich mode and detect signals from the front lambda sensor 6 and the rear lambda sensor 7, 7-1, 7-2, or 7-3 when the engine 1 is driven in the rich mode.

In addition, the main controller may be configured to compare the signals from the front lambda sensor 6 and the rear lambda sensor 7, 7-1, 7-2, or 7-3 to detect a breakthrough time at which a breakthrough occurs between the signals from the front lambda sensor 6 and the rear lambda sensor 7, 7-1, 7-2, or 7-3, determine an additional rich time period α based on the breakthrough time and a temperature of exhaust gas detected using the temperature sensor 8 or 9, and maintain the rich mode of the engine 1 for the additional rich time period α after the breakthrough time. The breakthrough time may be a time when the signal (e.g., a lambda value) from the front lambda sensor 6 is about the same as the signal (e.g. a lambda value) from the rear lambda sensor 7, 7-1, 7-2, or 7-3 when the engine 1 is driven in the rich mode. In particular, when a lambda value is determined to be less than 1 based on signal information from the rear lambda sensor 6 and/or the rear lambda sensor 7, 7-1, 7-2, or 7-3, the main controller may be configured to determine the engine 1 is driven (e.g., operated) in the rich mode. As described above, an additional rich time period α for lengthening the rich mode may be determined to optimally increase a generated amount of $NH_3$ of the LNT 2, wherein factors for determining the additional rich time period α may be a temperature of exhaust gas and a breakthrough time $t_{bt}$.

Figure 8:
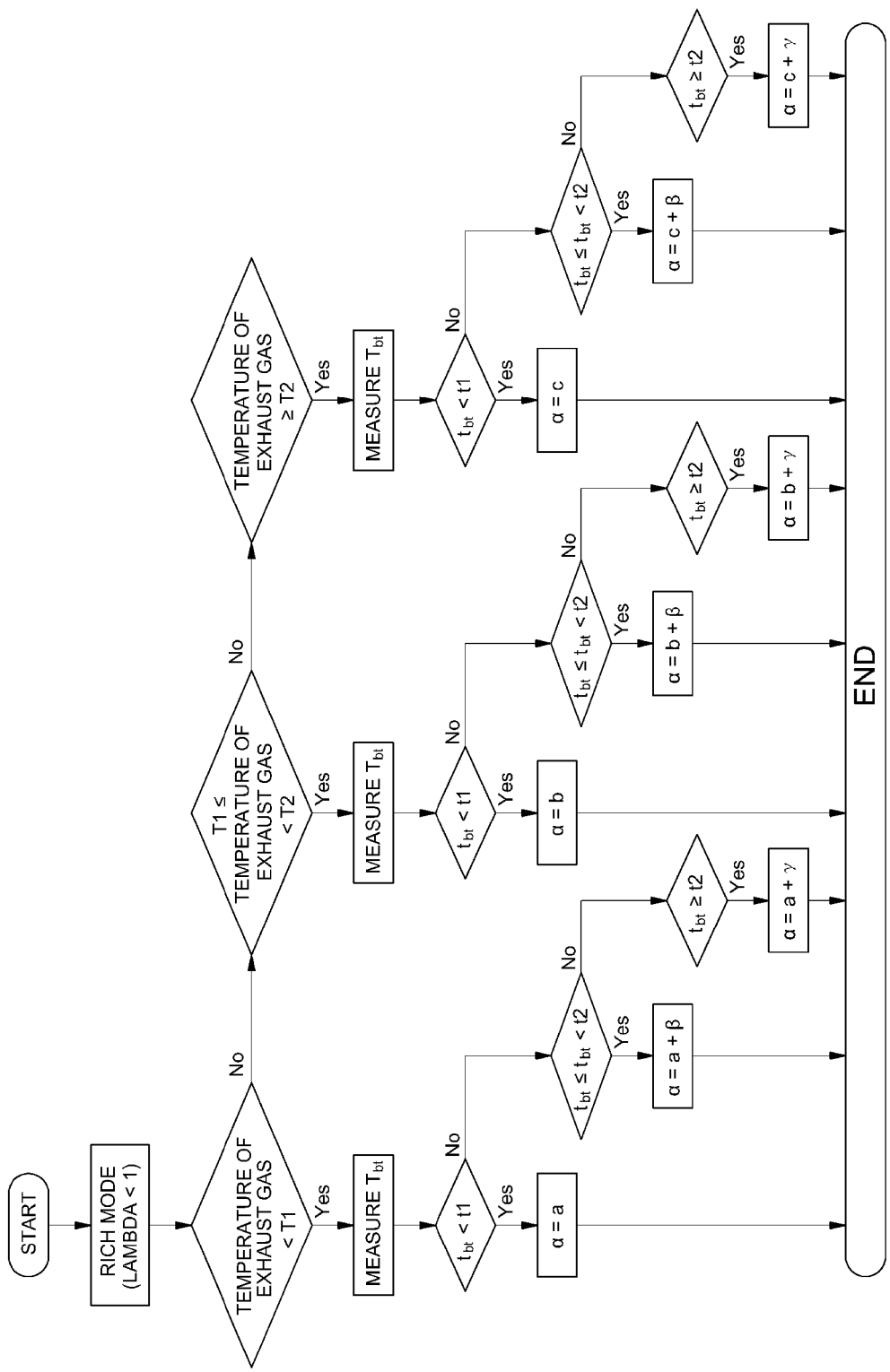
FIG. 8 is an exemplary flowchart illustrating a method of determining an additional rich time period based on a temperature of exhaust gas and a breakthrough time in an exhaust after-treatment apparatus according to an exemplary embodiment of the present disclosure.

FIG. 8 and Table 1 show an additional rich time period α that is determined based on a temperature T of exhaust gas and a breakthrough time $t_{bt}$.

TABLE 1

| | T | | |
|---|---|---|---|
| $t_{bt}$ | T < T1 | T1 ≤ T < T2 | T ≥ T2 |
| $t_{bt}$ < t1 | α = a | α = b | α = c |
| t1 ≤ $t_{bt}$ < t2 | α = a + β | α = b + β | α = c + β |
| $t_{bt}$ ≥ t2 | α = a + γ | α = b + γ | α = c + γ |

As shown in FIG. 8 and Table 1, when the rich mode for DeNOx is applied to the engine 1, the additional rich time period α may be determined to be a when a temperature T of exhaust gas is less than T1 (T<T1) and the breakthrough time $t_{bt}$ is earlier than (e.g., less than) t1 ($t_{bt}$<t1), the additional rich time period α may be determined to be a+β when the temperature T of exhaust gas is less than T1 (T<T1) and the breakthrough time $t_{bt}$ is later than (e.g., greater than) or equal to t1 and earlier than t2 (t1≤$t_{bt}$<t2), and the additional rich time period α may be determined to be a+γ when the temperature T of exhaust gas is less than T1 (T<T1) and the breakthrough time $t_{bt}$ is later than or equal to t2 ($t_{bt}$≥t2), wherein β<γ and t1<t2.

In addition, the additional rich time period α may be determined to be b when the temperature T of exhaust gas is greater than or equal to T1 and less than T2 (T1≤T<T2) and the breakthrough time $t_{bt}$ is earlier than t1 ($t_{bt}$<t1), the additional rich time period α may be determined to b+β when the temperature T of exhaust gas is greater than or equal to T1 and less than T2 (T1≤T<T2) and the breakthrough time $t_{bt}$ is later than or equal to t1 and earlier than t2 (t1≤$t_{bt}$<t2), and the additional rich time period α may be determined to be b+γ when the temperature T of exhaust gas is greater than or equal to T1 and lower than T2 (T1≤T<T2) and the breakthrough time $t_{bt}$ is later than or equal to t2 ($t_{bt}$>t2), wherein β<γ and t1<t2.

Further, the additional rich time period α may be determined to be c when the temperature T of exhaust gas is greater than or equal to T2 (T≥T2) and the breakthrough time $t_{bt}$ is earlier than t1 ($t_{bt}$<t1), the additional rich time period α may be determined to be c+β when the temperature T of exhaust gas is greater than or equal to T2 (T≥T2) and the breakthrough time $t_{bt}$ is later than or equal to t1 and earlier than t2 (t1≤$t_{bt}$<t2), and the additional rich time period α may be determined to be c+γ when the temperature T of exhaust gas is greater than or equal to T2 (T≥T2) and the breakthrough time $t_{bt}$ is later than or equal to t2 ($t_{bt}$≥t2), wherein β<γ and t1<t2. Herein, T1 may be less than T2. For example, T1 may be set to about 250° C. or less, and T2 may be set to about 350° C. or greater.

Since a largest amount of $NH_3$ may be emitted from the LNT 2 when the temperature T of exhaust gas is about 300° C., the values a, b, and c representing the additional rich time period α may satisfy b>c>a when 300° C. is between T1 and T2. The LNT 2 may have a later breakthrough time $t_{bt}$ and generate a greater amount of $NH_3$ since the LNT 2 has a greater storage amount of NOx and a lower deterioration of catalyst. In addition, as described above, the generated amount of $NH_3$ may decrease when the temperature of exhaust gas is less than or greater than 300° C.

Accordingly, the additional rich time period α after the breakthrough time $t_{bt}$ may be determined based on the temperature of exhaust gas and the breakthrough time $t_{bt}$, using a 3×3 matrix similar to Table 1. However, the additional rich time period α after the breakthrough time $t_{bt}$ may also be determined using a 2×2 matrix or a 4×4 matrix, according to different combinations of conditions, such as the temperature of exhaust gas and the breakthrough time $t_{bt}$, instead of the 3×3 matrix. Additionally, the additional rich time period α after the breakthrough time $t_{bt}$ may be determined using any other method based on the temperature of exhaust gas and the breakthrough time $t_{bt}$.

As described above, by determining an additional rich time period α based on a temperature of exhaust gas and a breakthrough time $t_{bt}$ to adjust a generated amount of $NH_3$, a generated amount of $NH_3$ may be effectively increased, a SCR located after a LNT may be configured reduce a large amount of NOx, the slip of CO/HC may be reduced, and a decrease in fuel efficiency may be prevented. In addition, future emission regulations may be effectively satisfied.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for operating an exhaust after-treatment apparatus, comprising:
   detecting, by a controller, signals from a front lambda sensor and a rear lambda sensor of a Lean NOx Trap (LNT), when an engine is driven in a rich mode;
   acquiring, by the controller, a temperature of exhaust gas detected by a temperature sensor, when the engine is driven in a rich mode;
   comparing, by the controller, the signals from the front lambda sensor and the rear lambda sensor to detect a breakthrough time when a breakthrough occurs between the signals from the front lambda sensor and the rear lambda sensor;
   determining, by the controller, an additional rich time period based on the breakthrough time and the temperature of exhaust gas; and
   transmitting, by the controller, a signal to drive the engine in the rich mode for the additional rich time period after the breakthrough time.

2. The method of claim 1, wherein the breakthrough time is a time when the signal from the front lambda sensor is about the same as the signal from the rear lambda sensor, when the engine is driven in the rich mode.

3. The method of claim 1, wherein the determination of the additional rich time period includes:
   determining, by the controller, the additional rich time period to be a, when the temperature of exhaust gas is less than T1 and the breakthrough time is less than t1;
   determining, by the controller, the additional rich time period to be a+β, when the temperature of exhaust gas is less than T1 and the breakthrough time is greater than or equal to t1 and less than t2; and
   determining, by the controller, the additional rich time period to be a+γ, when the temperature of exhaust gas is less than T1 and the breakthrough time is greater than or equal to t2,
   wherein β<γ and t1<t2.

4. The method of claim 1, wherein the determination of the additional rich time period includes:
   determining, by the controller, the additional rich time period to be b, when the temperature of exhaust gas is greater than or equal to T1 and less than T2, and the breakthrough time is less than t1;
   determining, by the controller, the additional rich time period to be b+β, when the temperature of exhaust gas is greater than or equal to T1 and less than T2, and the breakthrough time is greater than or equal to t1 and less than t2; and
   determining, by the controller, the additional rich time period to be b+γ, when the temperature of exhaust gas is greater than or equal to T1 and less than T2, and the breakthrough time is greater than or equal to t2,
   wherein β<γ, t1<t2, and T1<T2.

5. The method of claim 1, wherein the deciding of the additional rich time period comprises:
   determining, by the controller, the additional rich time period to be c, when the temperature of exhaust gas is greater than or equal to T2, and the breakthrough time is less than t1;
   determining, by the controller, the additional rich time period to be c+β, when the temperature of exhaust gas is greater than or equal to T2, and the breakthrough time is greater than or equal to t1 and less than t2; and
   determining, by the controller, additional rich time period to be c+γ, when the temperature of exhaust gas is greater than or equal to T2, and the breakthrough time is greater than or equal to t2,
   wherein β<γ and t1<t2.

6. A system for operating an exhaust after-treatment apparatus, comprising:
   a memory configured to store program instructions; and
   a controller configured to execute the program instructions, wherein the program instructions when executed configured to:
     detect signals from a front lambda sensor and a rear lambda sensor of a Lean NOx Trap (LNT), when an engine is driven in a rich mode;
     acquire a temperature of exhaust gas detected by a temperature sensor, when the engine is driven in a rich mode;
     compare the signals from the front lambda sensor and the rear lambda sensor to detect a breakthrough time when a breakthrough occurs between the signals from the front lambda sensor and the rear lambda sensor;
     determine an additional rich time period based on the breakthrough time and the temperature of exhaust gas; and transmit a signal to drive the engine in the rich mode for the additional rich time period after the breakthrough time.

7. The system for operating an exhaust after-treatment apparatus of claim 6, wherein the breakthrough time is a time when the signal from the front lambda sensor is about the same as the signal from the rear lambda sensor, when the engine is driven in the rich mode.

8. The system for operating an exhaust after-treatment apparatus of claim 6, wherein the program instructions that determine the additional rich time period includes program instructions configured to:
 determine the additional rich time period to be a, when the temperature of exhaust gas is less than T1 and the breakthrough time is less than t1;
 determine the additional rich time period to be a+β, when the temperature of exhaust gas is less than T1 and the breakthrough time is greater than or equal to t1 and less than t2; and
 determine the additional rich time period to be a+γ, when the temperature of exhaust gas is less than T1 and the breakthrough time is greater than or equal to t2, wherein β<γ and t1<t2.

9. The system for operating an exhaust after-treatment apparatus of claim 6, wherein the program instructions that determine the additional rich time period includes program instructions configured to:
 determine the additional rich time period to be b, when the temperature of exhaust gas is greater than or equal to T1 and less than T2, and the breakthrough time is less than t1;
 determine the additional rich time period to be b+β, when the temperature of exhaust gas is greater than or equal to T1 and less than T2, and the breakthrough time is greater than or equal to t1 and less than t2; and
 determine the additional rich time period to be b+γ, when the temperature of exhaust gas is greater than or equal to T1 and less than T2, and the breakthrough time is greater than or equal to t2,
 wherein β<γ, t1<t2, and T1<T2.

10. The system for operating an exhaust after-treatment apparatus of claim 6, wherein the program instructions that determine the additional rich time period includes program instructions configured to:
 determine the additional rich time period to be c, when the temperature of exhaust gas is greater than or equal to T2, and the breakthrough time is less than t1;
 determine the additional rich time period to be c+β, when the temperature of exhaust gas is greater than or equal to T2, and the breakthrough time is greater than or equal to t1 and less than t2; and
 determine additional rich time period to be c+γ, when the temperature of exhaust gas is greater than or equal to T2, and the breakthrough time is greater than or equal to t2, wherein β<γ and t1<t2.

11. A non-transitory computer readable medium containing program instructions executed by a processor or controller, the non-transitory computer readable medium comprising:
 program instructions that detect signals from a front lambda sensor and a rear lambda sensor of a Lean NOx Trap (LNT), when an engine is driven in a rich mode;
 program instructions that acquire a temperature of exhaust gas detected by a temperature sensor, when the engine is driven in a rich mode;
 program instructions that compare the signals from the front lambda sensor and the rear lambda sensor to detect a breakthrough time when a breakthrough occurs between the signals from the front lambda sensor and the rear lambda sensor;
 program instructions that determine an additional rich time period based on the breakthrough time and the temperature of exhaust gas; and
 program instructions that transmit a signal to drive the engine in the rich mode for the additional rich time period after the breakthrough time.

12. The non-transitory computer readable medium of claim 11, wherein the breakthrough time is a time when the signal from the front lambda sensor is about the same as the signal from the rear lambda sensor, when the engine is driven in the rich mode.

13. The non-transitory computer readable medium of claim A, further comprising:
 program instructions that determine the additional rich time period to be a, when the temperature of exhaust gas is less than T1 and the breakthrough time is less than t1;
 program instructions that determine the additional rich time period to be a+β, when the temperature of exhaust gas is less than T1 and the breakthrough time is greater than or equal to t1 and less than t2; and
 program instructions that determine the additional rich time period to be a+γ, when the temperature of exhaust gas is less than T1 and the breakthrough time is greater than or equal to t2,
 wherein β<γ and t1<t2.

14. The non-transitory computer readable medium of claim 10, further comprising program instructions that determine the additional rich time period to be b, when the temperature of exhaust gas is greater than or equal to T1 and less than T2, and the breakthrough time is less than t1;
 program instructions that determine the additional rich time period to be b+β, when the temperature of exhaust gas is greater than or equal to T1 and less than T2, and the breakthrough time is greater than or equal to t1 and less than t2; and
 program instructions that determine the additional rich time period to be b+γ, when the temperature of exhaust gas is greater than or equal to T1 and less than T2, and the breakthrough time is greater than or equal to t2,
 wherein β<γ, t1<t2, and T1<T2.

15. The non-transitory computer readable medium of claim 11, further comprising:
 program instructions that determine the additional rich time period to be c, when the temperature of exhaust gas is greater than or equal to T2, and the breakthrough time is less than t1;
 program instructions that determine the additional rich time period to be c+β, when the temperature of exhaust gas is greater than or equal to T2, and the breakthrough time is greater than or equal to t1 and less than t2; and
 program instructions that determine additional rich time period to be c+γ, when the temperature of exhaust gas is greater than or equal to T2, and the breakthrough time is greater than or equal to t2,
 wherein β<γ and t1<t2.

* * * * *